US009486806B1

(12) United States Patent
Scherer et al.

(10) Patent No.: US 9,486,806 B1
(45) Date of Patent: Nov. 8, 2016

(54) SYSTEM AND METHOD FOR PROCESSING CROP MATERIALS INTO LIVESTOCK FEED AND THE PRODUCT THEREOF

(75) Inventors: Bob A. Scherer, Tea, SD (US); Ross D. Dale, Pella, IA (US); Loren O. Olson, Wesby, WI (US)

(73) Assignee: CLAAS Saulgau GmbH, Bad Saulgau (DE)

( * ) Notice: Subject to any disclaimer, the term of this patent is extended or adjusted under 35 U.S.C. 154(b) by 545 days.

(21) Appl. No.: 13/274,921

(22) Filed: Oct. 17, 2011

Related U.S. Application Data

(60) Provisional application No. 61/470,681, filed on Apr. 1, 2011.

(51) Int. Cl.
*A23K 1/02* (2006.01)
*B02C 4/08* (2006.01)
*A23K 1/00* (2006.01)
*A23L 1/105* (2006.01)

(52) U.S. Cl.
CPC ............. *B02C 4/08* (2013.01); *A23K 1/007* (2013.01); *A23L 1/105* (2013.01)

(58) Field of Classification Search
CPC ...... B02C 4/30; A01D 43/08; A01D 43/081; A01D 69/00; A23K 1/007
USPC ........................................ 426/635, 630, 518
See application file for complete search history.

(56) References Cited

U.S. PATENT DOCUMENTS

| | | | |
|---|---|---|---|
| 258,176 | A | 5/1882 | Webber |
| 703,592 | A | 7/1902 | Jones |
| 1,203,901 | A | 11/1916 | Newhouse |
| 1,382,264 | A | 6/1921 | Baird |
| 1,773,720 | A | 8/1930 | Alland |
| 1,851,683 | A | 3/1932 | Herbert |
| 2,821,058 | A | 2/1956 | Jones |
| 3,197,147 | A | 7/1965 | Krohne |
| 4,345,417 | A | 8/1982 | deBuhr et al. |
| 4,505,434 | A | 3/1985 | Martenas et al. |
| 5,451,184 | A | 9/1995 | Mietzel |
| 5,822,962 | A | 10/1998 | Wagstaff et al. |
| 5,829,700 | A | 11/1998 | Pianca et al. |
| 5,976,012 | A | 11/1999 | Naaktgeboren et al. |
| 6,131,837 | A | 10/2000 | Wanner et al. |
| 6,139,478 | A | 10/2000 | Viaud et al. |
| 6,425,232 | B1 | 7/2002 | Desnijder et al. |
| 6,584,755 | B2 | 7/2003 | Holtkotte |
| 6,604,352 | B1 | 8/2003 | Tyvaert et al. |
| 7,189,160 | B2 | 3/2007 | Pirro |
| 7,296,763 | B2 | 11/2007 | Bliss et al. |
| 7,681,384 | B2 | 3/2010 | Scherer |
| 7,708,221 | B2 | 5/2010 | Engel |
| 8,480,019 | B1 | 7/2013 | Scherer et al. |
| 2013/0086879 | A1 | 4/2013 | Laumeier |

OTHER PUBLICATIONS

Gabriella A. Varga and Eric S. Kolver, "Microbial and Animal Limitations to Fiber Digestion and Utilization", The Journal of Nutrition 127, pp. 819S-823S, 1997 American Society for Nutritional Sciences.
W.Z. Yang and K.A. Beauchemin, Physically Effective Fiber: Method of Determination and Effects on Chewing, Ruminal Acidosis and Digestion by Dairy Cows, J. Dairy Sci. 89:2618.
Zhang et al., Design and Evaluation of a Corn Silage Harvester Using Shredding and Flail Cutting, Transactions of the ASAE, vol. 46(6):1503-1511.
D.R. Buckmaster, Assessing Activity Access of Forage or Biomass, Transactions of the ASABE, vol. 51(6)1879-1884.
T.D. Etherton, Improved Dairy Management Practices—FY 2003, Pennsylvania State University, Dairy & Animal Science, Project No. PEN03960.
Min Zhang and Dennis R. Buckmaster, The Design and Evaluation of a Novel Forage Harvester, Abstract from Paper No. 011088, 2001 ASAE Annual Meeting.
Min Zhang, Design and Evaluation of a Corn Silage-Making System With Shredding, A Thesis in Agricultural and Biological Engineering, The Pennsylvania State Univ., May 2002.
http://www.horningkernelprocessor.blogspot.com/:m=1, Horning Kernel Processor Rolls, blog posted Friday, Sep. 15, 2006, Kernel Processor Rolls at 7:22 AM.
Claas Multi-Crop Cracker, Jaguar Product Guide, The Multi-Crop Cracker—for forage quality you can be proud of.
Maschinenfabrik Bernard Krone GMBH, Krone BIG X Product Guide.
http://www.deere.com/wps/dcom/en_NAF/our_company/news_ and_media/press_releases . . . , John Deere new KernelStar Processor, News & Media, 2012 News Releases and Information.
Scherer Design Engineering, Inc., Scherer HP Processor product brochure.
Class 2008 Product Guide, Jaguar 980 970 960 950 940 930.
Class Pre-2009 Product Guide, Jaguar 900 890 870 850 830.
Class 2012 Product Guide, Jaguar 980 970 960 950 940 930.
Scherer H.D. Processor Roller Parts, 2005 Owner's Manual, pp. 12-12A.
Scherer Corrugating & Machine, Inc., brochure for Scherer H.D. Processor for Class 800's & 900 choppers.
Scherer H.D. Processor Model 2007, Operator's and Parts Manual, Scherer Corrugating and Machine, Inc.
Installation and Removal Instructions for B-LOC Locking Assembly Series B106 & B103.

(Continued)

*Primary Examiner* — Jyoti Chawla
(74) *Attorney, Agent, or Firm* — David M. Breiner; BrownWinick Law Firm

(57) ABSTRACT

A system and method for producing a feed product, and the product, are disclosed. A processor apparatus may comprise a housing and at least two rolls rotatably mounted on the housing, with a gap between the rolls through which the path of the crop materials passes. At least one roll may have alternating longitudinal ridges and grooves forming teeth on the surface of the roll. A rotating assembly may rotate the rolls with respect to the housing, and may rotate the rolls at different rotational speeds. A method may comprise cutting plants growing in a field, chopping the plants of the crop materials in a manner to produce pieces of the plants that have lengths of approximately 1 inch to approximately 2.5 inches long, and processing the plant pieces between the rolls rotating at a speed differential of at least 10 percent.

15 Claims, 8 Drawing Sheets

(56) References Cited

OTHER PUBLICATIONS

Link-Belt Bearing Division, Link-Belt TaperedBoreSphericalRoller Bearings Service instructions B-SRB-56.

Scherer Design Engineering, Inc., brochure for Scherer H.D. Processor for Class 800's & 900 choppers.

Scherer Design Engineering, Inc., brochure for Scherer HD and Scherer HP Processors.

Scherer Design Engineering, Inc., brochure for Scherer HP Processor Custom Designed for the CLAAS 494 Series Jaguar 950, 960, 970 & 980.

Scherer H.P. Processor Model 2009, Operator's and Parts Manual, Scherer Design Engineering, Inc.

High Capacity Dual Cut Roller—Horning Krop Processor.

Standard Features—Horning Krop Processor.

Horning Krop Processor.

Declaration of Leon Horning, Jr., Manager of Horning Manufacturing, Inc.

Horning Manufacturing, Inc., 2009 color brochure titled Horning Krop Processor High Capacity Dual Cut Roller, printed and distributed throughout the United States to customers of Horning Manufacturing, Inc.

Horning Manufacturing, Inc. 2006 Brochure titled "Horning Krop Processor", distributed throughout the United States to customers of Horning Manufacturing, Inc.

SYSTEM AND METHOD FOR PROCESSING CROP MATERIALS INTO LIVESTOCK FEED AND THE PRODUCT THEREOF

REFERENCE TO RELATED APPLICATION

This application claims the benefit of U.S. provisional patent application No. 61/470,681, filed Apr. 1, 2011, which is hereby incorporated by reference in its entirety.

BACKGROUND

1. Field

The present disclosure relates to the production of livestock feed and more particularly pertains to a new system and method for processing crops materials into livestock feed for providing a feed that is more readily digested by livestock, such as ruminant animals, and that particularly provides fiber that is more effectively digested by the animal.

2. Description of the Prior Art

Crop materials may be harvested and processed to produce silage, and in sometimes a forage harvester apparatus is used to harvest the crop materials from the field and perform some degree of processing of the crop materials in a manner that facilitates the formation of the silage before the materials are loaded into a storage container such as a silo or bag for fermentation. Typically, although not necessarily, the processing of the crop materials performed by the forage harvester includes cutting or chopping the crop materials into small pieces and crushing the crop materials to open the kernels present in the harvested materials.

Often the forage harvester includes a cutting or chopping stage and a processing stage. The apparatus of the chopping stage may include a drum or cutterhead that has a plurality of knives that are positioned in a spaced relationship along the circumference of the drum to cut the crop materials as the materials pass over a stationary shear bar inside the harvester. In many cases, the crop materials are cut into pieces that are relatively short, in the range of approximately 0.375 inches (approximately 9.5 mm) to approximately 0.75 inches (approximately 19 mm) long. The chopped crop material then moves to the apparatus of the processing stage which typically includes a pair of relatively closely spaced and generally cylindrical rolls with teeth that are intended to crush and open the kernels in the crop materials to enhance the nutritional availability of the kernels in the resultant feed.

SUMMARY

In view of the foregoing, the present disclosure describes a new system and method for processing crops materials into livestock feed which may be utilized to produce a feed that is more readily digested by livestock, such as ruminant animals, and that particularly provides fiber that is more effectively digested by the animal.

The present disclosure relates in one aspect to a method for processing crop materials to produce a feed product that provides the ingesting animal with a greater amount of available or effective fiber than using heretofore known methods of processing similar materials, and provides at least portions of the feed sp processed in a physical form that facilitates the natural ability of the animal to digest the fiber is a useful manner. A system is also disclosed that incorporates elements that provide the aspects of the method of producing the feed product.

In another aspect, the disclosure relates to a processor apparatus for processing crop materials into feed for livestock, with the processor apparatus being positionable in a forage harvester defining a path for moving crop materials cut from a field. The processor apparatus may comprise a housing for extending at least partially about the path of the crop materials, and at least two generally cylindrical rolls mounted on the housing. The rolls may be rotatable to move the crop materials through the housing, with a gap being formed between the rolls through which the path of the crop materials passes. At least one of the rolls may have a plurality of alternating longitudinal ridges and longitudinal grooves forming teeth on the surface of the roll. A rotating assembly may be configured to rotate the rolls with respect to the housing, the rotating assembly being configured to rotate the pair of rolls at different rotational speeds.

In still another aspect, the disclosure relates to a system for producing a feed product that may comprise a forage harvester defining a path for crop materials harvested from a field. The forage harvester may include a header apparatus for receiving and cutting plants in a field over which the harvester moves to thereby provide crop materials moved on the path through the harvester, with the crop materials comprising elements of the harvested plant including plant stalks and kernels. The forage harvester may also include a chopper apparatus receiving crop materials on the path from the header apparatus, and the chopper apparatus may comprise a shear bar over which the crop materials from the header apparatus pass, with the shear bar having a cutting edge. The chopper apparatus may also comprise a rotating cutterhead having a plurality of knives mounted on the circumference of cutterhead and being movable proximate to the cutting edge of the shear bar to cut crop materials passing over the shear bar. The cutterhead may be configured to cut plant stalks of the crop materials to lengths of approximately 1 inch to approximately 2.5 inches.

In yet another aspect, the disclosure relates to a method of producing feed for animals that may comprise cutting plants growing in a field by a header apparatus and placing the plants as crop materials on a path through a forage harvester, chopping the plants of the crop materials in a manner to produce pieces of the plants that have lengths of approximately 1 inch to approximately 2.5 inches long, and processing the plant pieces of the crop materials between rolls of a processor apparatus rotating at a speed differential of at least 10 percent.

The disclosure also relates to feed produced using the disclosure.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components of the systems, and the particulars of the steps of the methods, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
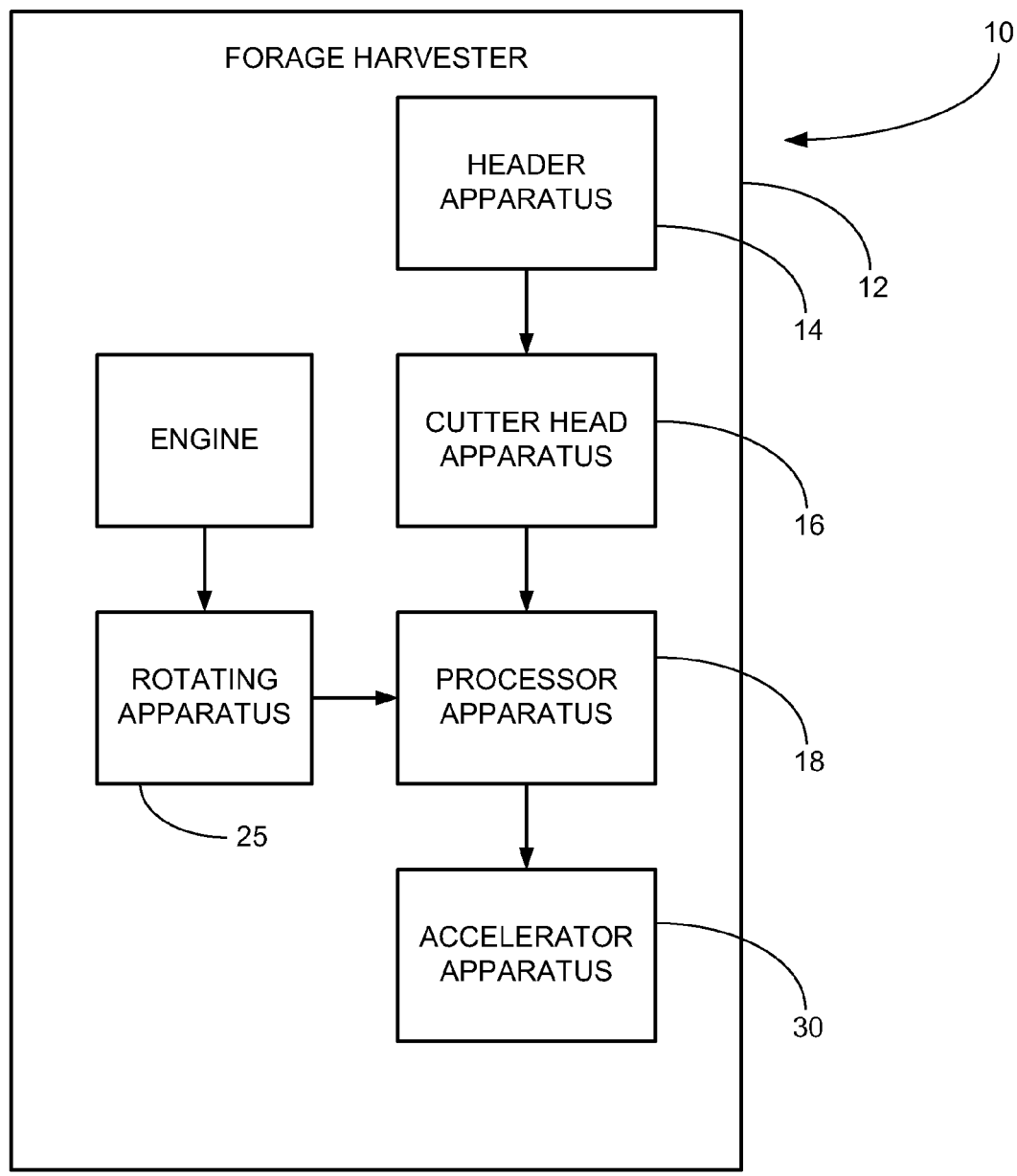
FIG. 1 is a schematic diagram of a new system for processing crops materials into livestock feed according to the present disclosure.
Figure 2:
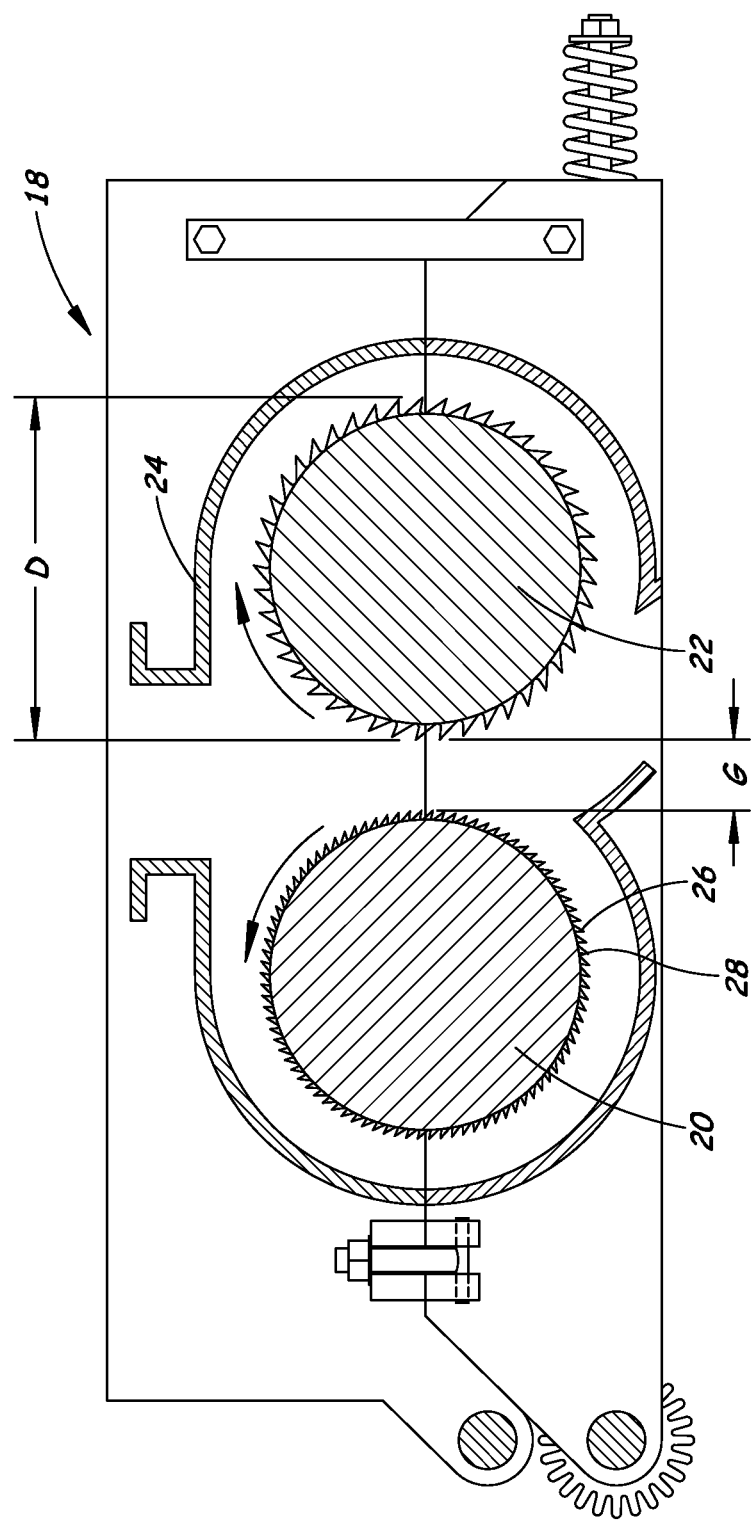
FIG. 2 is a schematic side sectional view of a processor apparatus, according to an illustrative embodiment.
Figure 3:
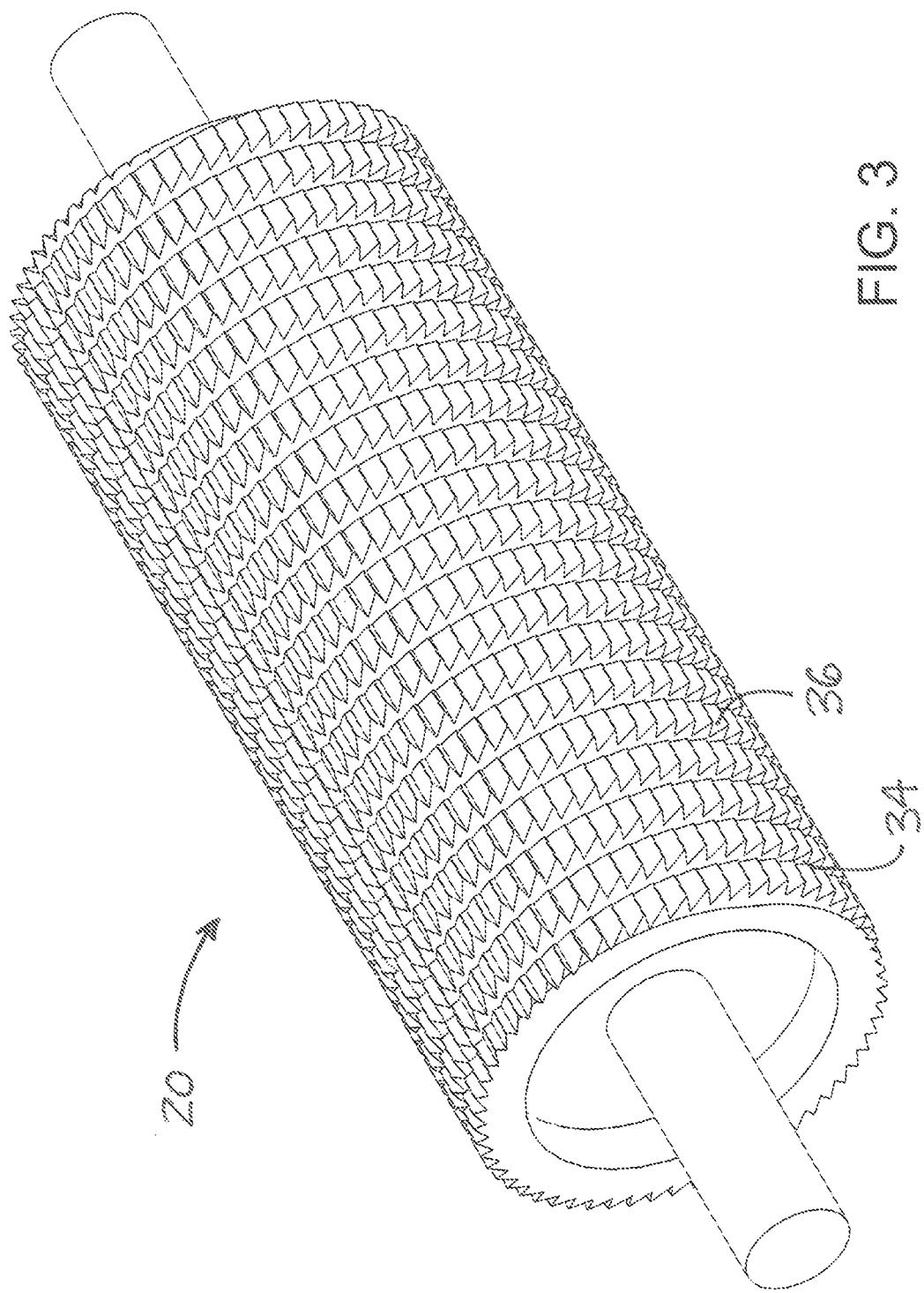
FIG. 3 is a schematic perspective view of one highly suitable processor roll design for use with the present disclosure.
Figure 4:
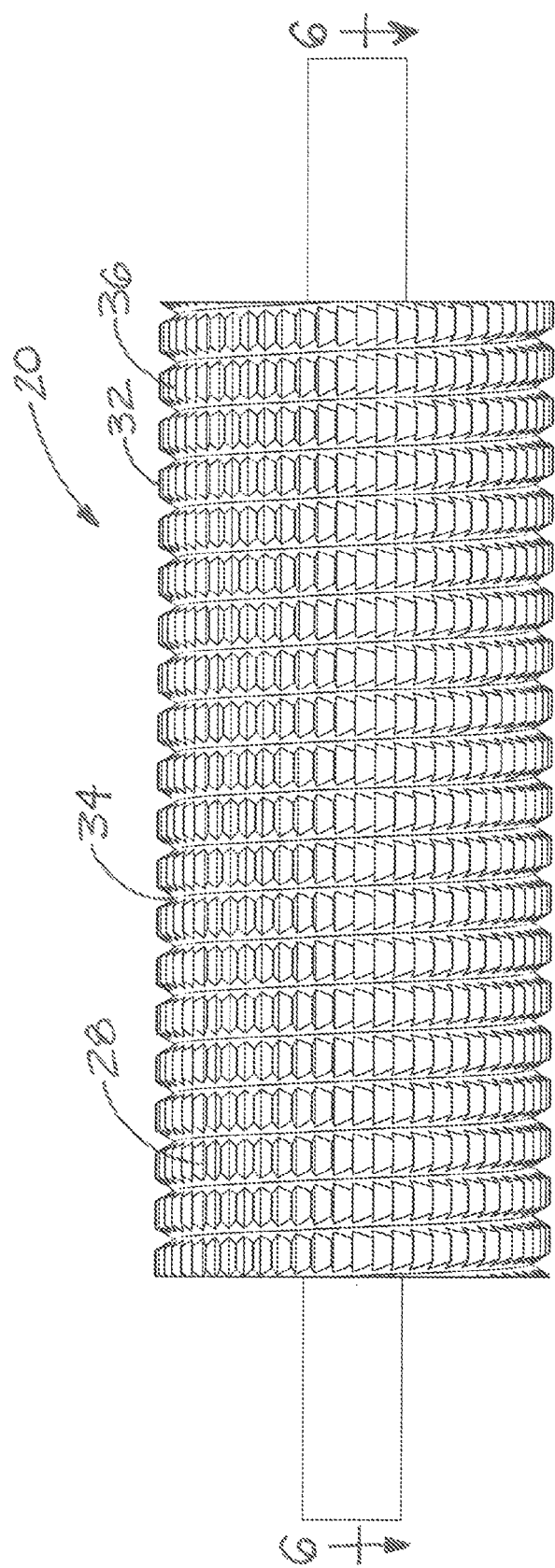
FIG. 4 is a schematic side view of the processor roll design shown in FIG. 3.
Figure 5:
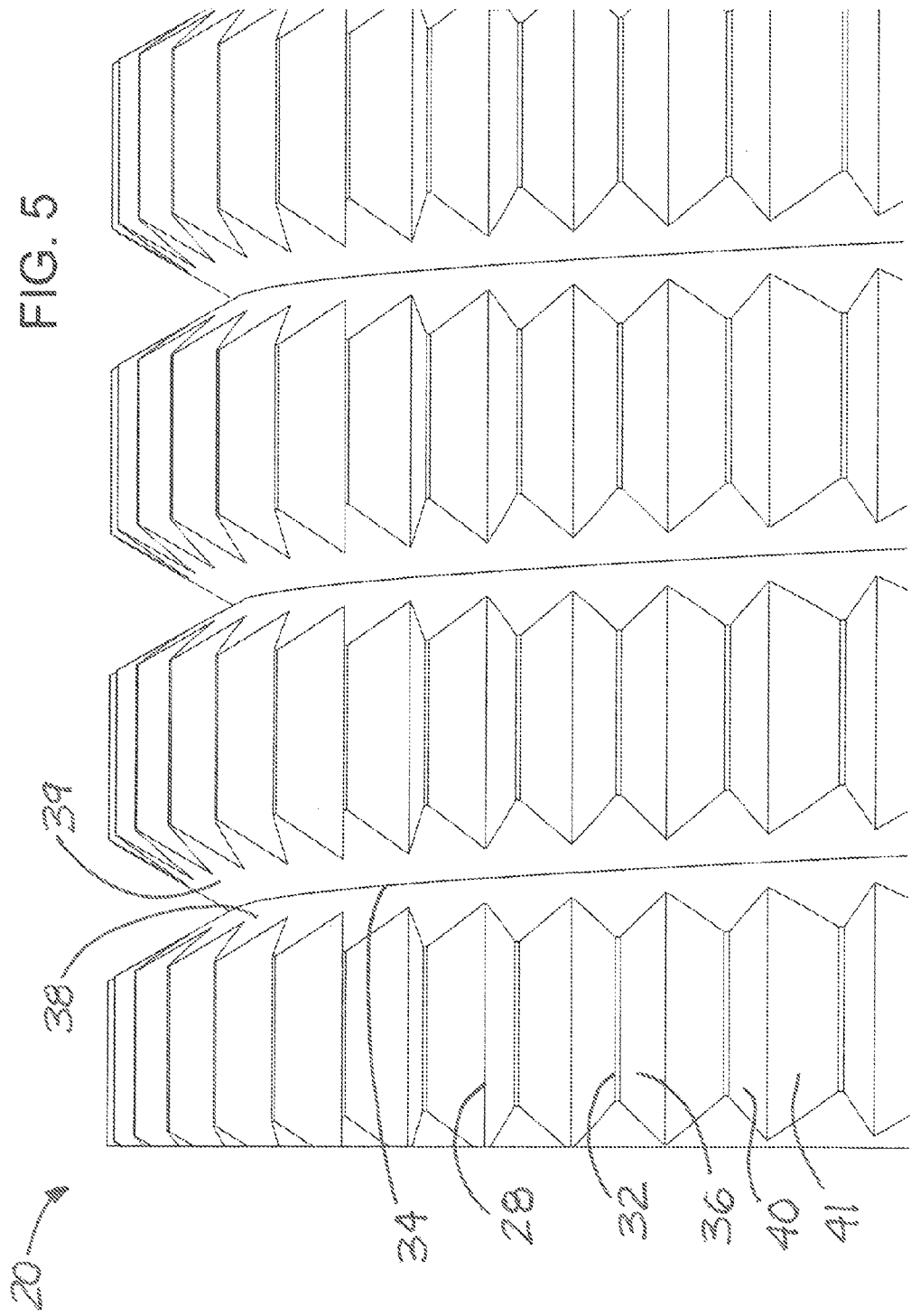
FIG. 5 is a schematic enlarged view of a portion of the side view of FIG. 4.
Figure 6:
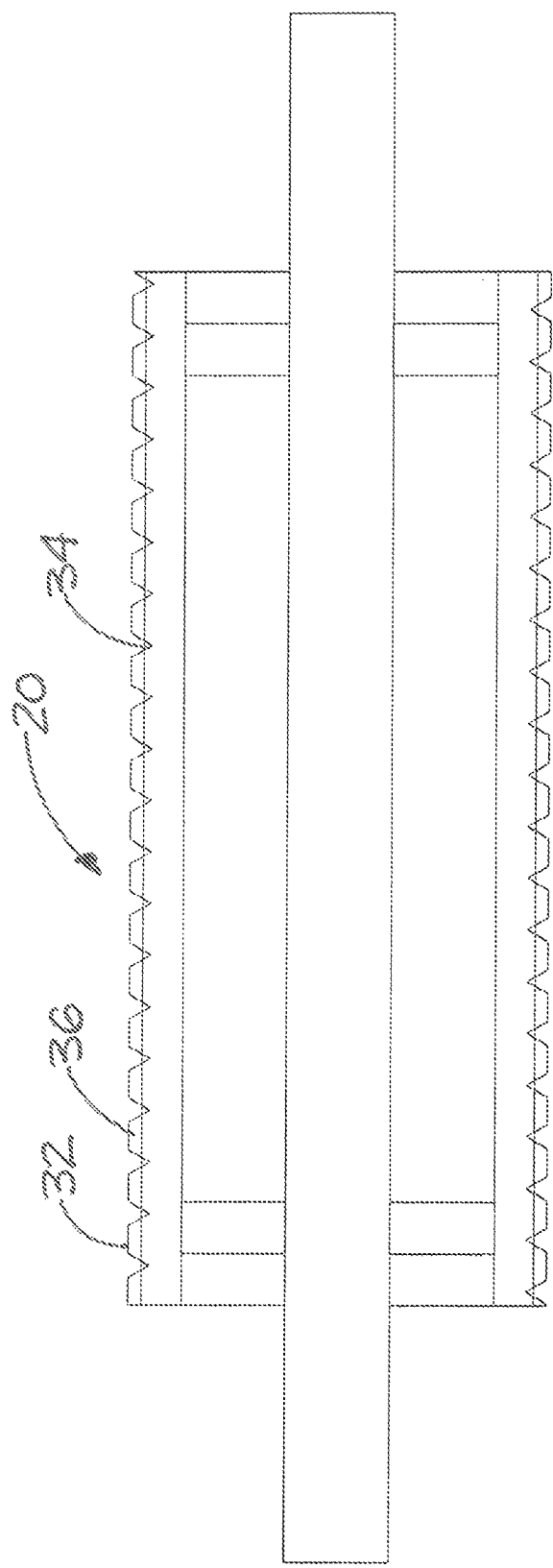
FIG. 6 is a schematic longitudinal sectional view of the processor roll of FIG. 4 taken along line 6-6 of FIG. 4.
Figure 7:
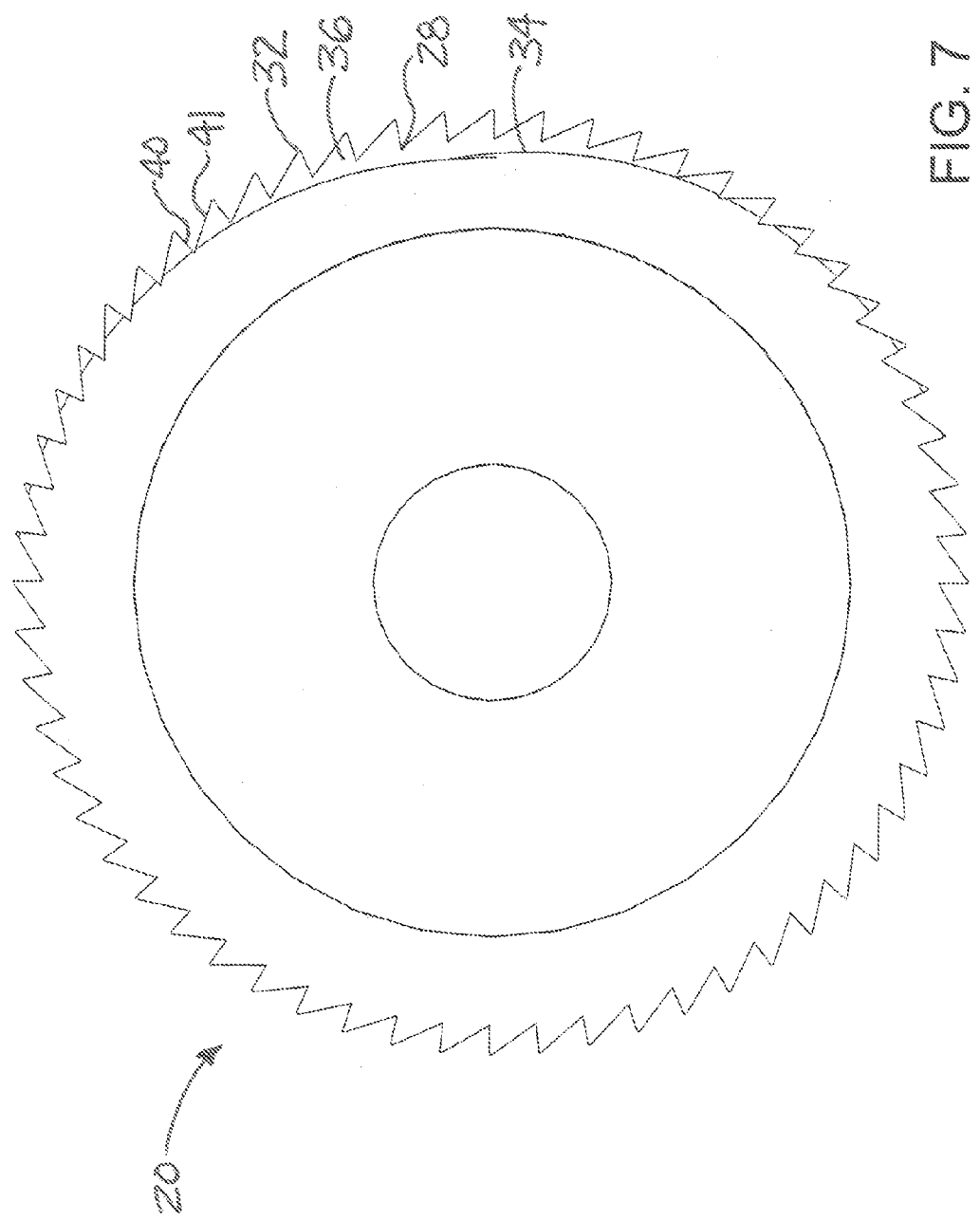
FIG. 7 is a schematic end view of the processor roll shown in FIG. 3.
Figure 8:
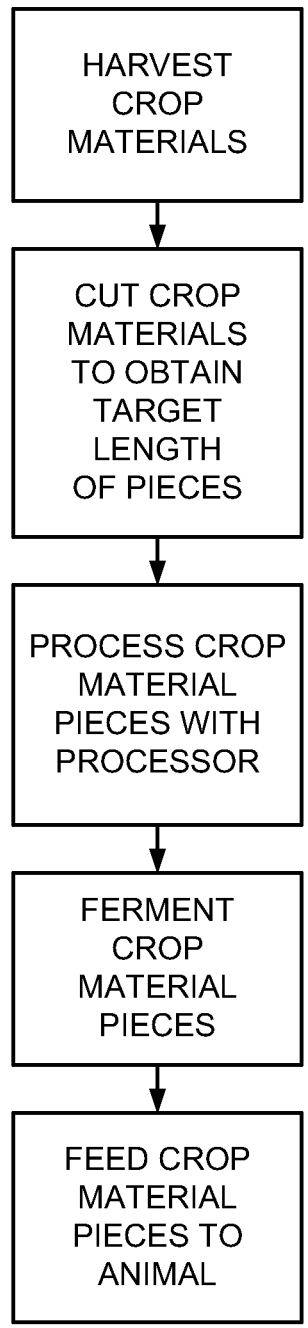
FIG. 8 is a schematic flow diagram of a method according to the present disclosure.

With reference now to the drawings, and in particular to FIGS. 1 through 8 thereof, a new system and method for processing crops materials into livestock feed embodying the principles and concepts of the disclosed subject matter will be described.

Broadly, the disclosure is generally directed to modifications of conventional silage chopping and processing apparatus and methods for producing a silage product that is more suitable for digestion by livestock, and in particular animals having rumen-based digestive systems such as cattle. While heretofore the focus of the chopping and processing of the crop materials has been on breaking up the kernels and cobs of the crop materials, the system and method of the present disclosure additionally focuses upon the form of the plant stalks, and in particular the size and character of the plant stalk pieces that are produced, to increase the nutritional value of the stalk pieces to the ingesting animals. In particular, the degree to which the fiber of the plant stalks may be effectively digested by the animal is enhanced.

A system 10 with suitable elements for producing a feed product with the desired characteristics may include a forage harvester 12 that may include a header apparatus 14 for cutting the plants in the field over which the harvester 12 is moving to thereby provide the crop materials that are moved through the harvester. The form of the header apparatus 14 is typically designed for the harvesting of a particular type of crop being harvested, but will not be further described here. Once cut from the ground in the field, the crop materials may include the various elements of the harvested plant, such as the plant stalk, leaves, kernels, cobs, as well as other plant matter.

The crop materials are moved from the header apparatus 14 through the harvester 12 to a chopper apparatus 16 that typically includes a rotating cutterhead or drum that includes a plurality of blades or knives mounted on the circumference of the drum to cut or chop the crop materials passing over a shear bar. The knives are spaced along the circumference of the cutterhead so that a knife passes across the shear bar at intervals as the crop materials pass over the shear bar. Cutterheads or drums that are suitable for modifying for the disclosed system are known, as well as suitable shear bar designs.

The chopped crop materials are then moved to a processor apparatus 18 that includes two generally cylindrical rolls 20, 22 in a housing 24, and a rotating assembly 25 may be utilized to rotate the rolls with respect to the housing. The rotating assembly 25 typically receives rotational input from the engine of the harvester through, for example, a series of belts, chains or gears, but could include a dedicated motor for rotating the rolls substantially directly. The rotating rolls move the materials through the housing of the processor. One or both of the processor rolls has a plurality of alternating ridges 26 and grooves 28 that form teeth on the surface of the roll. The crop materials may then pass through an accelerator apparatus 30 to facilitate movement through the harvester, although the presence of an accelerator is not critical to the systems and methods of the disclosure.

Applicants have determined that conventional silage processing apparatus and methods are primarily directed to maximizing the percentage of kernels of the crop materials that are opened by passing through the kernel processor apparatus of the forage harvester employed to gather and process the crop materials, but that efforts focusing solely on the task of kernel opening tend to produce pieces of the plant stalk that are difficult to digest by livestock having rumen-based digestive systems. The efforts to create systems that more effectively crush the kernels may thus be counterproductive to the goal of producing better digestion of the feed by the animal by making the stalks of the plant, and particularly the fiber thereof, less digestible by the animal.

Applicants have recognized that the conventional chopping and processing apparatus configurations, primarily designed for maximum kernel rupture, tend to over process the stalk pieces by crushing the pieces, and the crushed stalk pieces tend to make the fiber of the stalk less available to be digested by the animal, and thereby providing less effective fiber for the animal's nutrition. As a result, in addition to the processed crop materials (e.g., in the form of silage) fed to the animal, supplemental feed may also need to be fed to make up for the fiber that is present in the stalk pieces but not effectively digested by the animal's digestive process.

For example, to achieve greater kernel opening effectiveness, the substantially cylindrical rolls of the processor apparatus have been moved closer together in order to maximize the percentage of the kernels in the crop materials that are fractured or ruptured as the materials pass between the rolls. Applicants have determined that, as a result of moving the rolls of the kernel processor very close together, the stalks of the crop materials have been ground or crushed into a form that, when ingested by ruminant animal, tends to settle relatively quickly to the bottom of the chamber or chambers of the ruminant animal's digestive system. Thus, the crushing of the stalk pieces in turn tends to interfere with the ability and effectiveness of the animal's digestive system to digest the fiber in the plant stalks, making the fiber in the stalks less available and thus less beneficial to the animal, and can lead to ill effects on the animal beyond the loss of the nutritive value of the fiber.

Applicants have recognized that it would be desirable to develop and utilize a system and method which produces silage that not only maximizes the number of kernels that are opened, but that also provides plant stalk pieces that have fiber in a form that is more effective and suited to the digestion process of the animal. Applicants have determined that a product that is more digestible may be produced by controlling one or more of a number of factors or parameters of the harvesting and processing process that are different and foreign to the conventional manner of harvesting and processing the forage plants. This new system and method produces a new feed product that includes plant stalks that have a physical form that is markedly different from the form of plant stalks from crop materials that are harvested and processed in the conventional manner. Thus, using the same crop materials as an input, a feed product with more digestible fiber may be produced by controlling select parameters of the chopping and processing of the materials.

In some implementations, the feed product has stalk pieces with a physical form that may be characterized by being relatively flattened from the characteristic generally cylindrical shape of the stalk pieces in the unprocessed form. The stalk pieces may be generally split in a lengthwise direction, and the fibers of the stalk pieces in the product tend to be torn from each other so that some fibers of the stalk piece remain together in a group, but the fibers may be thinly connected to each other or to the fibers of other groups. The processed stalk piece of the product may thus be separated into two or more collections of the fibers of the plant, with some fibers connecting the collections together. The constituent fibers of the stalk piece may thus be at least partially torn from each other, although groups of the fibers may remain connected together despite the tearing that has occurred. The collections of fibers from the split stalk piece may form a structure with a mat-like appearance.

The stalk pieces with the general physical form and characteristics disclosed herein may provide more effective fiber to the ingesting animal by increasing the amount of surface area of the plant stalk that is exposed to the digestive fluids and microbes of the animal's digestive tract and therefore increases the ability of the digestive fluids to contact and act upon the plant stalk fibers. These elements of the animal's digestive tract are thus able to act more effectively upon the ingested fiber. For example, the relatively higher amount of surface area increases the extent of the plant stalk fibers exposed to the microbes for being acted upon by the microbes inhabiting the gut of the animal. Further, the plant stalk pieces of the form described herein may descend more slowly through the digestive fluids in the pouches of the digestive tract, which facilitates the action of the fluids and microbes on the plant stalk fibers. Slowing the passage rate of the fibers through the tract increases the time that the fibers are exposed to the fluids and microbes in the tract and thus the time that these elements are able to act upon the fibers. This characteristic is in contrast to stalk fibers processed by more conventional methods, which present a fairly compact crushed mass with less surface area for the digestive fluids to act upon, and are also relatively quicker to descend to the lower reaches of the compartments of the gut of the ingesting animal which may reduce the time that the digestive fluids and microbes have to act upon the fibers.

The applicants have found that one significant parameter of the harvesting and processing of the crop materials is the length of the pieces into which the plants of the crop materials, and in particular the plant stalks, are chopped or cut before further processing. For the purposes of this disclosure, the length of the pieces is generally measured in a direction parallel to the longitudinal length of the uncut plant stalk. Generally, the length represents a maximum length that is produced by the procession, as some pieces of shorter lengths are also likely to be produced by the disclosed systems and processes, and some pieces of longer lengths may also be produced, but in significantly smaller percentages of the total mass of plant stalks cut.

In some implementations, pieces of the plant stalks produced by the systems and methods of the disclosure may have lengths in the range of approximately 1 inch (approximately 26 mm) to approximately 2.5 inches (approximately 60 mm), while being relatively finely ground in thickness. In some further implementations, the fibers of the stalks of the processed crop materials may have lengths in the range of approximately 1.25 inches (approximately 32 mm) to approximately 1.5 inches (approximately 38 mm). The preferred piece lengths are in contrast to the length of plant stalk fibers produced by conventional forage harvester set ups that generally have fiber lengths of approximately 0.375 inches (approximately 9.5 mm) to approximately 0.75 inches (approximately 19 mm) long.

To provide stalk pieces with lengths that are generally longer than conventionally utilized, in some implementations of the system the circumferential separation or spacing between the blades of the drum of the chopper apparatus of the forage harvester is increased. In some embodiments of the chopping apparatus, the increase in circumferential separation distance may be produced by removing alternate blades from the drum of the chopper to effectively generally double the length of the cut pieces as compared to what would have been produced otherwise. It will be appreciated that other suitable manners of forming the longer stalk piece lengths may be utilized.

Cutting the crop materials, and in particular the plant stalks, into longer pieces than conventional may change the manner in which the stalk pieces are handled by the processor and the physical form of the pieces output by the processor. The cut stalk pieces with the longer length tend to be processed by a processor apparatus in a manner that is different from pieces that have a shorter length, and as a result tend to exit the processor in a form that is different than when the pieces have a shorter length. More specifically, the stalk pieces with longer lengths tend to travel through the processor with their longest axis oriented substantially parallel to the direction that the pieces are moving through the processor. This movement orientation tends to cause an end of the stalk piece to enter the processor and pass between the processor rolls, first with an initial or forward end and then the remainder of the piece follows with the end opposite the initial end, or rearward end, passing between the rolls last. The movement of the piece in a longitudinal manner through the processor tends to produce pieces of plant stalk that are split into pieces in the lengthwise direction, or parallel to the longitudinal length of the plant stalk piece. Thus, the plant stalk pieces have approximately the same length after being processed than before being processed using the systems and processes of the disclosure and are not compressed lengthwise. This lengthwise movement may at least partially contribute to the physical form of the processed stalk pieces that is described herein for the feed product. It will be appreciated that the increase in the length of the stalk pieces produced by the chopper does not affect the degree to which the kernels are opened by the processor.

Another parameter that may also contribute to the unique character of the stalk pieces produced by the system and process of the disclosure is the size of the rolls utilized in the kernel processor that acts upon the stalk pieces as well as the kernels of the crop materials passing through the processor. Conventional processor apparatus generally utilize rolls that have diameters of approximately 10 inches (approximately 250 mm) diameter or less. In the many preferred embodiments of the system, the processor apparatus 18 includes at least one roll, and in many embodiments a pair of the rolls, having a diameter that is larger than conventional processor rolls, and may have a diameter (D) that is greater than approximately 10 inches (approximately 250 mm) in size, and may be approximately 12 inches (approximately 300 mm) or larger in size, and in many implementations may have a diameter of approximately 12 inches (approximately 300 mm) to approximately 16 inches (approximately 400 mm).

The employment of rolls in the processor apparatus that have relatively larger diameters provides a greater surface area of the roll that is in contact with the crop materials moving between the rolls at any one time. The greater surface area in contact with the stalks may result in a longer time period of contact with the stalks, and a longer time for the roll to act on the stalk to provide a greater chance for and degree of tearing the stalk into constituent fibers or groups of fibers. The relatively larger diameter of the rolls also reduces the pinch angle between the crop materials moving between the rolls and the surface of the rolls, which may reduce crushing of the stalk pieces. The increased roll diameter may also provide greater consistency or uniformity in the physical form of the crop materials passing out of the processor apparatus.

As an additional benefit, the relatively larger diameter of the rolls allows the rolls to rotate at a slower rotational speed that produces substantially the same speed of movement of the surface of the roll, and thus the same speed of movement of the crop materials through the processor, but the slower rotational speed reduces wear on the components of the processor apparatus.

Another parameter of the system and process that may contribute to the character of the stalk pieces in the output of the processor is the character of the surface of the rolls, and the grooves or grooving formed on the surface of at least one of the rolls, and in many preferred embodiments, grooving formed on the surfaces of both of the rolls, of the processor apparatus. The grooves on the roll surface form teeth-like projections formed by alternating grooves and ridges on the surface that extend in a generally longitudinal direction on the roll and may extend from one end of the roll to the other end of the roll. In some of the most preferred embodiments, the teeth-like projections have a cross sectional shape similar to a saw-tooth, and in some further embodiments, the saw-tooth-shaped teeth of one roll may be oriented oppositely to the saw-tooth-shaped teeth of the other roll (see FIG. 2). The density of ridges or teeth on a roll may be defined as the number of ridges per distance measured along the circumference of the roll, such as ridges or teeth per inch of circumference. The size and density of the teeth may be approximately 3 ridges or teeth per inch (approximately 1.2 teeth per cm) to approximately 8 teeth per inch (approximately 3.2 teeth per cm), and while this tooth size and density is highly preferable, other sizes and densities for the teeth may be employed. This range of ridge or tooth density, and the resulting tooth size, may contribute to the tearing of the fibers of the plant stalk material away from each other, particularly in combination with the longer time of contact between the larger rolls and the stalks of the crop materials.

Another parameter of the system that may contribute to the desired character of the stalk pieces is the difference or differential in the rotational speeds of the rolls as the crop material passes therebetween, as a difference in the rotational speeds of the rolls further contributes to the tearing of the fibers of the stalk from each other. A higher or greater differential between rotational speeds is believed to increase the tearing of the fibers of the stalk from each other and produce the desired physical form described herein that enhances the availability of the fiber to the digestive system of the animal. In many preferred implementations, the rotational speed differential is between approximately 10 percent and approximately 200 percent, so that, with respect to the rotational speed of one roll, the rotational speed of the other roll may be approximately 10 percent faster to approximately 200 percent faster.

Another parameter that may be effective in producing the desired physical form or character of the processed plant stalks is the spacing of the rolls from each other. Generally, the axes of rotation of the rolls of the processor apparatus are substantially parallel to each other, and the rolls are spaced from each other to form a gap therebetween that is substantially uniform in width along the length of the rolls. The size of the gap may also contribute to the degree to which the fibers of the stalk pieces are torn from each other, particularly where the stalk pieces move through the gap with the longitudinal axis of the pieces aligned with the direction of movement of the pieces. Further, the relative closeness of the rolls contributes to the beneficial flattening of the stalk pieces without excessive crushing of the pieces. While the closeness of the rolls may tend to crush stalk pieces with shorter lengths into a less digestible mass of fiber, the relatively longer length of the stalk pieces of the disclosure tend to resist crushing as the fibers are pulled apart rather than staying together, particularly in the context of the other parameters of the processor disclosed herein. In some implementations of the system and method, the spacing of the rolls with respect to each other, and thus the gap (G) therebetween, may be in the range of approximately 0.01 inches (approximately 0.25 mm) to approximately 0.1 inches (approximately 3 mm), which is highly preferable for obtaining the desired character of the stalk pieces, as well as ensuring that a large percentage of the kernels present in the crop materials are crushed, although other spacings may also be used. As will be described below, other characteristics of the system may affect the suitable range of roll spacings.

Another characteristic of the rolls that may provide more effective shredding of the plant stalk material is the character of the ridges 26 that form the teeth-like projections between the longitudinally-extending grooves 28. In many embodiments of the rolls, the ridges 26 extend for the entire, or substantially the entire, length of the roll between the ends of the roll where the mounting shafts extend from the roll. In some further embodiments, the outer edges 32 of the ridges (which form the primary contact point for the materials being processed) may be continuous along a line that extends substantially from one end of the roll to the other. In other embodiments, the outer edges 32 of the ridges 26 may be interrupted by gaps and thus the outer edge of the ridge may be intermittent or segmented between the ends of the roll. As shown in FIGS. 3 through 7, one or both of the pair of rolls 20, 22 of the processor may have one or more circumferential grooves 34 formed in the roll that cross the longitudinally-extending ridges 26 and grooves 28. For example, the circumferential groove 34 may be formed in the circumference of the roll along a helical path that intersects and cuts across the ridges of the roll that are formed or defined by the longitudinally-extending grooves 28. In other embodiments, a series of circular circumferential grooves may be formed between the ends of the roll at uniform or non-uniform spacings with respect to each other. The circumferential groove 34 or grooves may have a depth that is greater than the depth of the longitudinally-extending grooves 28, although this is not critical. The circumferential grooves 34 may form segmented teeth 36 on the outer edges 32 of the ridges 26 that improve the ability of the roll to produce the desired shredding of the plant stalks into pieces of the desired character.

The teeth 36 that are formed by the combination of the longitudinally-extending and circumferential grooves may have outer edges that are short linear edges, or lands, that extend in a longitudinal direction of the roll. Illustratively, the profile of a tooth may have a truncated pyramid shape in a longitudinal cross section (see FIG. 6) and may have a full (or substantially full) pyramid shape in a lateral cross section (see FIG. 7). In some embodiments, the circumferential grooves 34 may be substantially V-shaped, and the side surfaces 38, 39 of the groove may be substantially identical in size and shape, although this is not critical, and some truncation of the bottom of the V-shaped groove may be utilized. In some embodiments, the longitudinally-extending grooves 28 may have a configuration in which the side surfaces 40, 41 are not substantially identical, and one side surface 41 may be larger than the other side surface 40 such that the teeth appear to lean or lead toward one circumferential direction and away from the opposite circumferential direction.

In some embodiments, the longitudinal lengths of the tooth segments or teeth 36 are less than approximately 1 inch (approximately 2.5 cm), and in some other embodiments the longitudinal lengths of the segments may be from approximately 0.125 inches (approximately 0.3 cm) to approximately 0.75 inches (approximately 2 cm). Further, in some embodiments the depth of the circumferential groove or grooves (as measured from the outermost extent of the ridges) is less than approximately 0.5 inches (approximately 1.3 cm) and may be from approximately 0.02 inches (approximately 0.05 cm) to approximately 0.25 inches (approximately 0.65 cm). Further, some embodiments of the rolls may have V-shaped circumferential grooves 34 that range from approximately 30 degrees to approximately 120 degrees between the side surfaces 38, 39 of the groove, and in some embodiments may be from approximately 40 degrees to approximately 100 degrees between the side surfaces of the groove.

Rolls that include the circumferential grooves have relatively shorter outer edges on the lands of the teeth 36 that facilitate the penetration of the tooth into the plant stalk as compared to rolls having longer lands such as on a ridge that is continuous between the roll ends. The relatively smaller outer edge 32 of the land is able to tear the stalk apart as a land on the opposite roll pierces the stalk from substantially the opposite direction. As a result of the easier penetration and more effective tearing provided by the shorter lands, less pressure is needed to be exerted by the rolls against the plant stalks and the rolls of the processor can be spaced further apart from each other while still providing an effective level of tearing and shredding of the plant stalk. Consequently, the relatively larger gap between the rolls may require less power to drive the rolls because the crop material is not crushed to as great a degree before it is shredded. Also, the wider roll gap imposes less stress on the rolls, and thus the teeth of the roll tend to remain sharp for a longer period, which results in less cost to the user for roll maintenance and replacement. The relatively wider gap between rolls also allows the processor to operate more quietly due to less air turbulence being created between the rolls. Also, greater throughput is achieved using the wider gap, allowing the harvester to move at a faster rate through the field at harvest.

Illustratively, a pair of rolls lacking the circumferential groove may have a gap therebetween of approximately 0.04 inches (approximately 1 mm) to approximately 0.08 inches (approximately 2 mm), and a pair of rolls having the circumferential groove may have a gap therebetween of approximately 0.12 inches (approximately 3 mm) and approximately 0.24 inches (approximately 6 mm) and in some of the more preferred embodiments, a gap of approximately 0.14 inches (approximately 3.5 mm) to approximately 0.22 inches (approximately 5.5. mm).

Even with the wider gap, the combination of coarse and fine rolls operated together, with the short lands at a suitable spacing between each other, help to ensure that the kernels of the crop materials are also ground into pieces as the plant stalks are torn and shredded.

Applicants have recognized that processing the crop materials in the manner of the present disclosure, and particularly with relatively longer length of the stalk pieces, tends to be more difficult to process by the processor apparatus of the forage harvester, and stronger and more durable components may need to be employed in the processor apparatus. Further, as the rolls of the processor are spring biased toward each other, the biasing force applied to the rolls may need to be increased, and the biasing elements, such as springs, may need to be strengthened as compared to conventional processors.

In another aspect, the disclosure includes methods of processing crop materials including the plant materials using various aspects disclosed or suggested herein to provide a feed that is highly suitable for digestion by ruminant animals. The method may include, for example, cutting plants that are growing in a field by using a header apparatus and placing the plants of the crop materials on a path through a forage harvester, and chopping the plants of the crop materials in a manner disclosed that produces pieces of the plants that have the lengths disclosed, and processing the plant pieces between rolls of a processor apparatus rotating at a speed differential to facilitate the tearing of the plant materials of at least 10 percent.

In still another aspect, the disclosure includes the feed produced by the systems and apparatus having the various aspects disclosed or suggested herein, and by methods including the various aspects of handling also disclosed or suggested herein.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A method of producing a silage feed for animals having a relatively long physically effective fiber obtained from cut and torn plant stalks, the method comprising:
cutting plants growing in a field by a header apparatus and placing the plants as crop materials on a path through a forage harvester;
chopping the plants of the crop materials in a manner to produce pieces of the plants that have lengths of approximately 1 inch to approximately 2.5 inches long; and
processing the plant pieces of the crop materials between rolls of a processor apparatus rotating at a speed differential of at least 10 percent, wherein
the rolls are positioned with a gap in between of approximately 0.01 inches to approximately 0.24 inches,
the first roll includes a plurality of alternating longitudinal ridges and grooves and at least one circumferential groove having a depth of less than 0.5 inches that crosses the longitudinal ridges and grooves to form a plurality of gaps along the longitudinal ridges to form tooth segments between the ends of the first roll,
the tooth segments substantially extend in a longitudinal direction of the roll, and
the tooth segments have longitudinal lengths of less than 1 inch and have smaller outer edges forming sharp cutting teeth far easier penetration and effective tearing of plant stalk while the rolls of the processor are spaced apart.

2. The method of claim 1, wherein a density of ridges on the rolls is approximately 3 ridges per inch to approximately 8 ridges per inch.

3. The method of claim 1 wherein processing further comprises:
providing the rolls of the processor apparatus with diameters greater than approximately 10 inches.

4. The method of claim 1 wherein processing further comprises:
providing the rolls of the processor apparatus with at least one V-shaped circumferential groove.

5. The method of claim 1 additionally comprising feeding the processed pieces of plants to a ruminant animal.

6. The method of claim 1 wherein processing further comprises
providing the rolls of the processor apparatus with alternating ridges and grooves and a density of ridges on the rolls is approximately 3 ridges per inch to approximately 8 ridges per inch;
wherein processing further comprises providing the rolls of the processor apparatus with diameters greater than approximately 10 inches; and
wherein processing further comprises providing each of the rolls with at least one circumferential groove.

7. The method of claim 1, wherein the at least one circumferential groove is a spiral groove.

8. A method of producing a silage feed for animals having relatively long physically effective fiber obtained from cut and torn plant stalks, the method comprising:
cutting plants growing in a field by a header apparatus and placing the plants as crop materials on a path through a forage harvester;
using the forage harvester to chop the crop materials in a manner to produce stalk pieces having lengths of approximately 1 inch to approximately 2.5 inches long; and
processing the crop materials using rolls to rip a plurality of the stalk pieces in a lengthwise direction of the stalk piece so as to produce feed for animals, wherein
the rolls are positioned with a gap in between of approximately 0.01 inches to approximately 0.24 inches,
the rolls are controlled to rotate at a speed differential of at least ten percent,
the first roll includes a plurality of alternating longitudinal ridges and grooves and at least one circumferential groove having a depth of less than 0.5 inches that crosses the longitudinal ridges and grooves to form a plurality of gaps along the longitudinal ridges to form tooth segments between the ends of the first roll,
the tooth segments substantially extend in a longitudinal direction of the roll, and
the tooth segments have longitudinal lengths of less than 1 inch and have smaller outer edges forming sharp cutting teeth far easier penetration and effective tearing of plant stalk while the rolls of the processor are spaced apart.

9. The method of claim 8, further comprising:
fracturing of kernels obtained with the crop materials.

10. The method of claim 8, wherein the stalk pieces are processed by a processor apparatus and travel through the processor apparatus with their longest axis oriented substantially parallel to the direction of movement through the processor apparatus.

11. The method of claim 8, wherein the rolls are comprised of two rolls each having alternating ridges and grooves.

12. The method of claim 8, wherein processing further comprises providing the rolls with diameters greater than approximately 10 inches.

13. The method of claim 8, wherein processing further comprises providing the rolls with at least one V-shaped circumferential groove.

14. The method of claim 8 additionally comprising:
feeding the processed pieces of plants to a ruminant animal.

15. The method of claim 8, wherein the at least one circumferential groove is a spiral groove.

* * * * *